United States Patent
Norman

(10) Patent No.: US 10,162,341 B2
(45) Date of Patent: Dec. 25, 2018

(54) METHOD FOR SEQUENCING A PLURALITY OF TASKS PERFORMED BY A PROCESSING SYSTEM AND A PROCESSING SYSTEM FOR IMPLEMENTING THE SAME

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

(*) Notice: Subject to any disclaimer, the term of this patent is extended or adjusted under 35 U.S.C. 154(b) by 457 days.

(21) Appl. No.: 14/879,572

(22) Filed: Oct. 9, 2015

(65) Prior Publication Data

US 2016/0103713 A1    Apr. 14, 2016

Related U.S. Application Data

(60) Provisional application No. 62/062,683, filed on Oct. 10, 2014.

(51) Int. Cl.
*G06F 9/48* (2006.01)
*G06F 9/50* (2006.01)
*G06Q 10/06* (2012.01)
*G05B 19/418* (2006.01)

(52) U.S. Cl.
CPC ..... *G05B 19/41865* (2013.01); *G06F 9/4887* (2013.01); *G06F 9/505* (2013.01); *G06F 9/5038* (2013.01); *G06Q 10/06316* (2013.01)

(58) Field of Classification Search
CPC .................. G05B 19/41865–19/4187; G05B 2219/25419; G05B 2219/25422;
(Continued)

(56) References Cited

U.S. PATENT DOCUMENTS 5,884,077 A * 3/1999 Suzuki ............... G06F 9/505 718/103
7,236,843 B1 * 6/2007 Wizelman ........ G05B 19/41865 700/100

(Continued)

OTHER PUBLICATIONS

Drexl, A., "Scheduling of Project Networks by Job Assignment," Management Science [online], vol. 37, No. 12, Dec. 1991 [retrieved Jan. 14, 2018], Retrieved from Internet: <URL: http://www.jstor.org/stable/pdf/2632730.pdf>, pp. 1590-1602.*

(Continued)

*Primary Examiner* — Todd Aguilera
(74) *Attorney, Agent, or Firm* — Patterson + Sheridan, LLP

(57) ABSTRACT

A method for sequencing a plurality of tasks performed by a processing system and a processing system for implementing the same are disclosed herein. In one embodiment, a method for sequencing a plurality of tasks performed by a processing system is provided that includes generating a schedule by iteratively performing a scheduling process and processing a plurality of substrates using the plurality of semiconductor processing equipment stations according to the schedule. The scheduling process uses highly constrained tasks and determines whether a portion of the first list of the highly constrained tasks exceeds a capacity of the processing system. The scheduling process further includes updating the latest start time and the earliest start time associated with each of the plurality of tasks yet to be scheduled based on the assigned task.

12 Claims, 7 Drawing Sheets

(58) Field of Classification Search
CPC ........... G05B 2219/31023; G05B 2219/32008;
G05B 2219/32086; G05B 2219/32131;
G05B 2219/32248; G05B 2219/32252;
G05B 2219/32279; G05B 2219/32283;
G05B 2219/32297; G05B 2219/32306;
G05B 2219/32328; G05B 2219/32332;
G05B 2219/32361; G05B 2219/34418;
G05B 2219/39167; G06F 9/5038; G06F
9/505; G06F 9/4887; G06Q
10/0631–10/06316
USPC ......................... 700/100, 701; 718/102–104;
705/7.13–7.26
See application file for complete search history.

(56) References Cited

U.S. PATENT DOCUMENTS

| | | | | |
|---|---|---|---|---|
| 7,930,339 B2* | 4/2011 | Tobita | ................... | G06F 9/4887 709/202 |
| 2007/0110094 A1* | 5/2007 | Tobita | ................... | G06F 9/4887 370/453 |
| 2015/0160977 A1* | 6/2015 | Accapadia | ............ | G06F 9/5083 718/104 |

OTHER PUBLICATIONS

Kusiak, A., et al., "Concurrent engineering: decomposition and scheduling of design activities," Int. J. Prod. Res. [online], vol. 28, No. 10, 1990 [retrieved Jan. 14, 2018], Rerieved from Internet: <URL: https://s3.amazonaws.com/academia.edu.documents/42419775/Concurrent_engineering_Decomposition_and20160208-16430-zsleoo.pdf>, pp. 1883-1900.*

* cited by examiner

METHOD FOR SEQUENCING A PLURALITY OF TASKS PERFORMED BY A PROCESSING SYSTEM AND A PROCESSING SYSTEM FOR IMPLEMENTING THE SAME

CROSS-REFERENCE TO RELATED APPLICATIONS

This application claims priority from U.S. Provisional Application Ser. No. 62/062,683, filed Oct. 10, 2014, which is hereby incorporated by reference in its entirety.

BACKGROUND

Field

The invention generally relates to a method for sequencing a plurality of tasks performed by a processing system and a processing system for implementing the same.

Description of the Related Art

In semiconductor manufacturing, there is often a length of time, known as queue time, during which a substrate may have to reside outside the process station or controlled environment for a period of time while waiting for that equipment to become available. During the queue time, the substrate may be exposed to ambient environmental conditions that include oxygen and water at atmospheric pressure and room temperature. As a result, the substrate subjected to oxidizing conditions in the ambient environment may accumulate native oxides or contaminants on the metal surface prior to the subsequent metallization process.

Often, there is a constraint between a deposition of a dielectric layer on a substrate and a post deposition anneal process. For example, anneal process must begin within a certain time after the deposition of the dielectric layer is complete. This type of constraint is referred to as a queue time limit. Generally, a queue time limit is a constraint between two tasks, for example, Task 1 and Task 2. Generally, Task 1 must occur before Task 2. When there is a queue time limit between the two tasks, Task 2 must also begin within a certain amount of time after Task 1 is completed. Thus, Task 2 cannot begin until after Task 1 is complete, but also must begin before the queue time expires. This relationship may be expressed as:

$$T_1 > T_2 > T_{1Duration} + \text{Queue Time Limit}.$$

Where $T_1$ represents Task 1, $T_2$ represents Task 2, $T_{1Duration}$ represents the time it takes $T_1$ to complete, and the Queue Time Limit represents the time within which $T_2$ must begin after the completion of $T_1$.

Queue time constraints pose significant sequencing hurdles because once a process that starts the queue time is scheduled, that process limits the time range where the later operation can be scheduled. For example, once deposition is scheduled, the deposition process limits the time range where a subsequent related anneal process may be scheduled. After several such processes are scheduled, there are subsequent processes with limited start time ranges. There is no existing mathematical algorithm to determine if there is sufficient capacity to schedule the subsequent processes, short of iteratively scheduling them.

Thus, there is a need for a method to more effectively schedule a plurality of tasks to be performed by a processing system.

SUMMARY

A method for sequencing a plurality of tasks performed by a processing system and a processing system for implementing the same are disclosed herein. In one embodiment, a method for sequencing a plurality of tasks performed by a processing system is provided that includes generating a schedule by iteratively performing a scheduling process and processing a plurality of substrates using the plurality of semiconductor processing equipment stations according to the schedule. The scheduling process includes generating a first list of highly constrained tasks from the plurality of tasks yet to be scheduled based on a difference between a latest start time and an earliest start time of each respective task, and determining whether a portion of the first list of the highly constrained tasks exceeds a capacity of a plurality of semiconductor processing equipment stations comprising the processing system. The scheduling process additionally includes, responsive to determining the portion of the first list does exceed the capacity, assigning a task from the first list of highly constrained tasks at a next available time on one of the plurality of semiconductor processing equipment stations. The scheduling process additionally includes, responsive to determining the portion of the first list does not exceed the capacity, assigning a task from the plurality of tasks to run at a next available time on one of the plurality of semiconductor processing equipment stations. The scheduling process further includes updating the latest start time and the earliest start time associated with each of the plurality of tasks yet to be scheduled based on the assigned task.

In another embodiment, a method for sequencing a plurality of substrate processing tasks to be performed by a processing system includes generating a schedule for the plurality of substrate processing tasks by iteratively performing a scheduling process, and processing a plurality of substrates using the plurality of semiconductor processing equipment stations according to the schedule. The process of generating the schedule further includes generating a first list of highly constrained tasks from the plurality of substrate processing tasks yet to be scheduled based on a difference between a latest start time and an earliest start time of each respective substrate processing task, and determining whether a portion of the first list of the highly constrained tasks exceed a capacity of the plurality of semiconductor processing equipment stations. Responsive to determining the portion of the first list does exceed the capacity, assigning a substrate processing task from the first list of highly constrained tasks at a next time on one of the plurality of semiconductor processing equipment stations. Responsive to determining the portion of the first list does not exceed the capacity, assigning a task from the plurality of substrate processing tasks to run at a next time on one of the plurality of semiconductor processing equipment stations. The process of scheduling additionally includes updating the latest start time and the earliest start time associated with each of the plurality of substrate processing tasks yet to be scheduled based on the assigned substrate processing task.

In yet another embodiment, a semiconductor processing system is provided that includes a plurality of semiconductor processing equipment stations and a controller coupled to the semiconductor processing equipment station. The controller is configured to generate a schedule by iteratively performing a scheduling process and to cause a plurality of substrates to be processed in the plurality of semiconductor processing equipment stations according to the schedule. The scheduling process includes generating a first list of highly constrained tasks from the plurality of tasks yet to be scheduled based on a difference between a latest start time and an earliest start time of each respective task, and determining whether a portion of the first list of the highly constrained tasks exceeds a capacity of the plurality of semiconductor processing equipment stations comprising the processing system. The scheduling process also includes responsive to determining the portion of the first list does exceed the capacity, assigning a task from the first list of highly constrained tasks at a next available time on one of the plurality of semiconductor processing equipment stations. The scheduling process also includes responsive to determining the portion of the first list does not exceed the capacity, assigning a task from the plurality of tasks to run at a next available time on one of the plurality of semiconductor processing equipment stations. The scheduling process also includes updating the latest start time and the earliest start time associated with each of the plurality of tasks yet to be scheduled based on the assigned task.

BRIEF DESCRIPTION OF THE DRAWINGS

The accompanying drawings, which are incorporated in and constitute a part of the specification, schematically illustrate the present invention and, together with the general description given above and the detailed description given below, serve to explain the principles of the invention.

For clarity, identical reference numerals have been used, where applicable, to designate identical elements that are common between figures.

DETAILED DESCRIPTION

Figure 1:
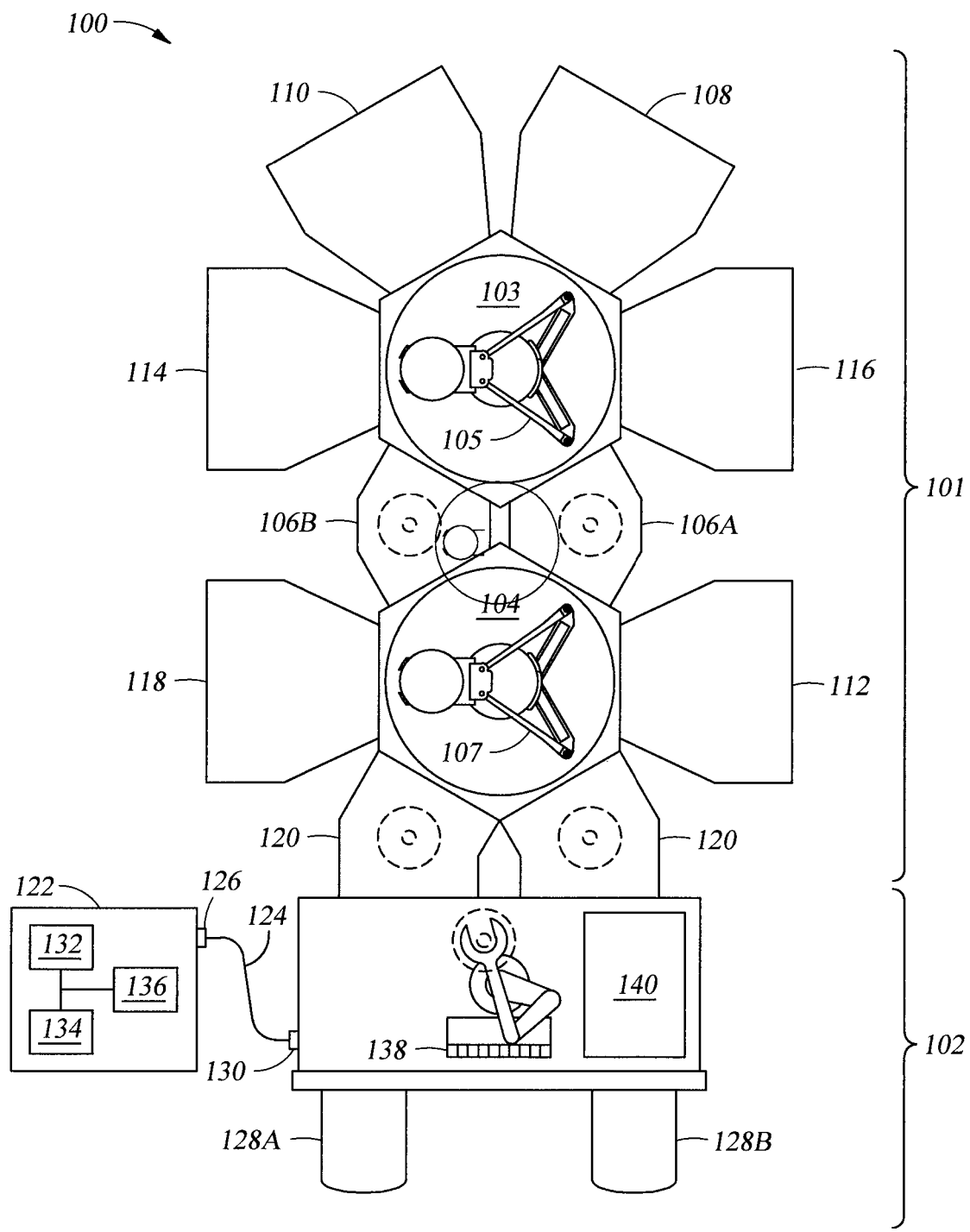
FIG. 1 schematically illustrates a processing system for semiconductor processing.

Embodiments of the present disclosure are described herein in accordance with a substrate processing sequence. FIG. 1 schematically illustrates a processing system 100 for semiconductor processing in accordance with one embodiment of the disclosure. It is contemplated that the methods described herein may be practiced in other tools having other configurations.

The processing system 100 includes a vacuum-tight processing platform 101 and a factory interface 102. The platform 101 comprises a plurality of processing stations 108, 110, 112, 114, 116, 118 and at least one load-lock station 120, which are coupled to vacuum substrate transfer stations 103, 104. The factory interface 102 is coupled to the transfer station 104 by the load lock station 120.

In one embodiment, the factory interface 102 comprises at least one docking station, at least one substrate transfer robot 138, and at least one substrate aligner 140. The docking station is configured to accept one or more front opening unified pod (FOUP) 128. Two FOUPs 128A, 128B are shown in the example depicted in FIG. 1. The substrate transfer robot 138 is configured to transfer substrates in the factory interface 102 between the FOUPs 128A, 128B, and the load lock station 120.

A controller 122 is connected to the processing system 100. The controller 122 is connected to the processing system 100 by connectors 124, which flow from a first port 126 on the controller 122 to a second port 130 on the factory interface 102.

The above-described processing system 100 can be controlled by a processor based system controller such as controller 122. For example, controller 122 may be configured to control the schedule generated in the process of FIG. 2. The controller 122 includes a programmable central processing unit (CPU) 132 that is operable with a memory 134 and a mass storage device, an input control unit, and a display unit (not shown), such as power supplies, clocks, cache, input/output (I/O) circuits, and the like, coupled to the various components of the processing system 100 to facilitate control of the processes of the schedule generated by the process of FIG. 2. The controller 122 also includes hardware for monitoring the process of FIG. 2 through sensors (not shown) in the processing system 100. Other sensors that measure system parameters such as substrate temperature, chamber atmosphere pressure and the like, may also provide information to the controller 122.

Figure 2:
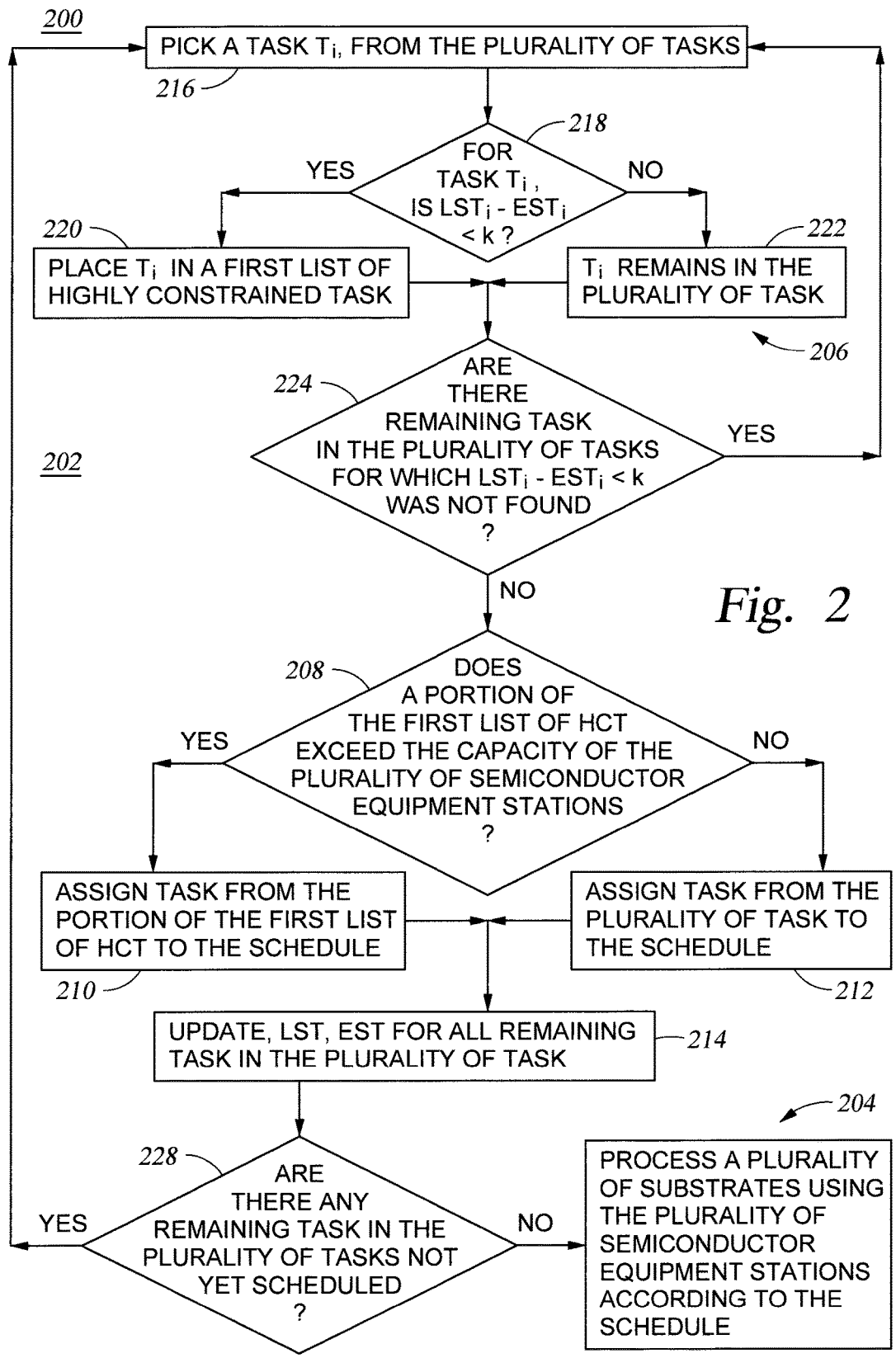
FIG. 2 illustrates a flow diagram of a process sequence for scheduling a plurality of tasks on a plurality of stations of a semiconductor processing tool such as the processing system of FIG. 1.

To facilitate control of the processing system 100 and the schedule generated in FIG. 2, the CPU 132 may be one of any form of general purpose computer processors that can be used in an industrial setting, such as a programmable logic controller (PLC), for controlling various process stations 108, 110, 112, 114, 116, 118. The memory 134 is coupled to the CPU 132 and the memory 134 is non-transitory and may be one or more of readily available memory such as a random access memory (RAM), read only memory (ROM), floppy disk drive, hard disk, or any other form of digital storage, local or remote. Support circuits 136 are coupled to the CPU 132 for supporting the processor in a conventional manner. The process of FIG. 2 is generally stored in the memory 134. The process of FIG. 2 may also be stored and/or executed by a second CPU (not shown) that is remotely located from the hardware being controlled by the CPU 132.

The memory 134 is in the form of computer-readable storage media that contains instructions, that when executed by the CPU 132, facilitates the operation of the schedule of FIG. 2 in the processing system 100. The instructions in the memory 134 are in the form of a program product such as a program that implements the method of the present disclosure. The program code may conform to any one of a number of different programming languages. In one example, the disclosure may be implemented as a program product stored in computer readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g. floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

The load lock station 120 is coupled between the factory interface 102 and the first transfer station 104. The load lock station 120 is coupled to a pressure control system which pumps down and vents the load lock station 120 as needed to facilitate passing the substrate between the vacuum environment of the transfer station 104 and the substantially ambient (e.g., atmospheric) environment of the factory interface 102.

The first transfer station 104 and the second transfer station 103 respectively have a first robot 107 and a second robot 105 disposed therein. Two substrate transfer platforms 106A, 106B are disposed between the transfer stations 103, 104, to facilitate transfer of the substrate between robots 105, 107. The platforms 106A, 106B can be open to the transfer stations 103, 104 or be selectively isolated (i.e. sealed) from the transfer stations 103, 104 to allow different operational pressures to be maintained in each of the transfer stations 103, 104.

The robot 107 disposed in the first transfer station 104 is capable of transferring the substrates between the load lock station 120, the processing stations 112, 118 and the substrate transfer platforms 106A, 106B. The robot 105, disposed in the second transfer station 103, is capable of transferring substrates between the substrate transfer platforms 106A, 106B and the processing stations 116, 114, 110, 108.

The processing stations 108, 110, 112, 114, 116, 118 may be a CVD chamber, a plasma etch chamber, a PVD chamber, anneal chamber, thermal treatment chamber, UV treatment chamber, ion implantation chamber, abatement chamber, or a native oxide removal chamber, among others.

FIG. 2 illustrates a flow chart of one embodiment of a process 200 for scheduling a plurality of tasks performed by the processing system, such as the processing system 100 described above. The process 200 is saved on a memory and can be executed by controller 122 to cause the system 100 to process a substrate according to the schedule.

The process 200 begins at operation 202 by generating a schedule by iteratively performing a scheduling process, and ends at operation 204 by processing a plurality of substrates using the plurality of semiconductor processing equipment stations of the processing system 100, such as processing stations 108, 110, 112, 114, 116, and 118, according to the schedule of operation 202.

Generating a schedule by iteratively performing a scheduling process at operation 202 that includes operations 206, 208, 210, 212, 214 and 228. At operation 206, a first list of highly constrained tasks from a plurality of tasks yet to be scheduled is generated. The first list generated at operation 206 is based on a difference between a latest start time and an earliest start time of each respective task.

At operation 208, the process determines whether a portion of the first list of the constrained tasks, generated in operation 206, exceeds a capacity of the plurality of semiconductor processing equipment stations. The capacity is exceeded when the number of constrained tasks in the first list exceeds the number of semiconductor processing equipment stations such that the number of constrained tasks in the first list exceeds the number of semiconductor processing equipment stations multiplied by a constant, or exceeds the number of semiconductor processing stations plus a constant. The constant is any number greater than zero, and may be configured by the user.

If a portion of the first list generated at operation 206 is found to exceed the capacity, as determined at operation 208, operation 210 provides that a task from a portion of the first list of highly constrained tasks is assigned at a next available time to be processed on one of the plurality of semiconductor processing equipment stations.

If, however, a portion of the first list generated at operation 206 is found not to exceed the capacity of the plurality of semiconductor processing equipment stations, as determined at operation 208, then a task from the plurality of tasks is assigned to run at a next available time to be processed on one of the plurality of semiconductor processing equipment stations.

After a task is assigned pursuant to either operation 210 or 212, operation 214 updates the latest start time and the earliest start time associated with each of the plurality of tasks yet to be scheduled based on the assigned task. The latest start time and the earliest start time associated with each of the plurality of tasks yet to be scheduled are updated because the scheduling of an assigned task may change the latest start time and the earliest start time of the remaining tasks.

The plurality of tasks of process 200 comprises a first task and a second task. The first task and second task are, for example, a dielectric layer deposition process and a post deposition treatment process operation as in semiconductor processing. Each task in the plurality of tasks is assigned an earliest start time (EST) and a latest start time (LST). An EST is the earliest time a task may be scheduled on a station. Similarly, an LST is the latest time that a task may be scheduled on a station. Accordingly, each task in the plurality of tasks also has an earliest end time (EET) and a latest end time (LET) corresponding to the earliest start time (EST) and the latest start time (LST), respectively. The EET is the earliest time that a task could be completed. The EET typically is the EST plus the duration of the task being performed. The LET is the latest time that a task could be completed. The LET typically is the LST plus the duration of the task being processed. The EST, EET, LST, and LET are continually updated pursuant to operation 214. Prior to the scheduling of any task, the EST for each first task is at time t=0. The EET for each first task, prior to any task being scheduled, is the EST plus the duration of processing the first task. Prior to the scheduling of any task, the LST for each first task is a large number, which can take on any value of time. The LET for this respective first task is the LST plus the duration of processing the first task. The second task relies on the first task to determine its respective set of $EST_2$, $EET_2$, $LST_2$, $LET_2$. $EST_2$ is $EET_1$ plus the time required to transfer the substrate from a first equipment station to a second equipment station. $EET_2$ is the $EST_2$ plus the duration of the second task. The $LST_2$ depends on two factors: (1) the $LET_1$; and (2) any queue time limit that exists between the first task and the second task. A queue time limit is a constraint between two tasks such that the second task must begin processing within a predefined period of time after the first task has completed. If a queue time limit exists between the first task and the second task, then the $LST_2$ is the $LET_1$ plus the duration of the queue time limit. If a queue time limit does not exist between the first task and the second task, then the $LST_2$ may be any time after the $LET_1$.

At operation 206, the list of tasks generated is a list of highly constrained tasks. Operation 206 comprises sub-operations 216, 218, 220, 222, and 224. In sub-operation 216, a first task $T_i$, is chosen from the plurality of tasks. Sub-operation 218 determines whether $T_i$ is a highly constrained task. A highly constrained task is determined by the difference between a task's LST and EST. If the difference between the task's LST and EST is less than some value, k, then that task is considered a highly constrained task. The relationship between LST and EST may be expressed as:

$$LST-EST<k.$$

Wherein k is a constant greater than zero, and may be set by the user. For example, k may equal the duration of a process, such as the duration of task one. The difference between the LST and the EST is determined for each task in the plurality of tasks. The difference may change per iteration of operation 202. If $T_i$ is a highly constrained task, then sub-operation 220 provides that $T_i$ is placed in a first list of highly constrained tasks. If, however, $T_i$ is not a highly constrained task, then sub-operation 222 provides that $T_i$ remains in the plurality of tasks.

After sub-operations 220 and 222 are complete, sub-operation 224 determines whether there are any tasks remaining in the plurality of tasks. If, however, all tasks in the plurality of tasks are checked to determine whether a given task is a highly constrained task, then operation 206 is deemed complete.

Once each task in the plurality of tasks is classified as either a highly constrained task or a non-highly constrained task, operation 208 determines whether a portion of the first list of the highly constrained tasks exceeds a capacity of the plurality of semiconductor processing equipment stations.

Figure 3:
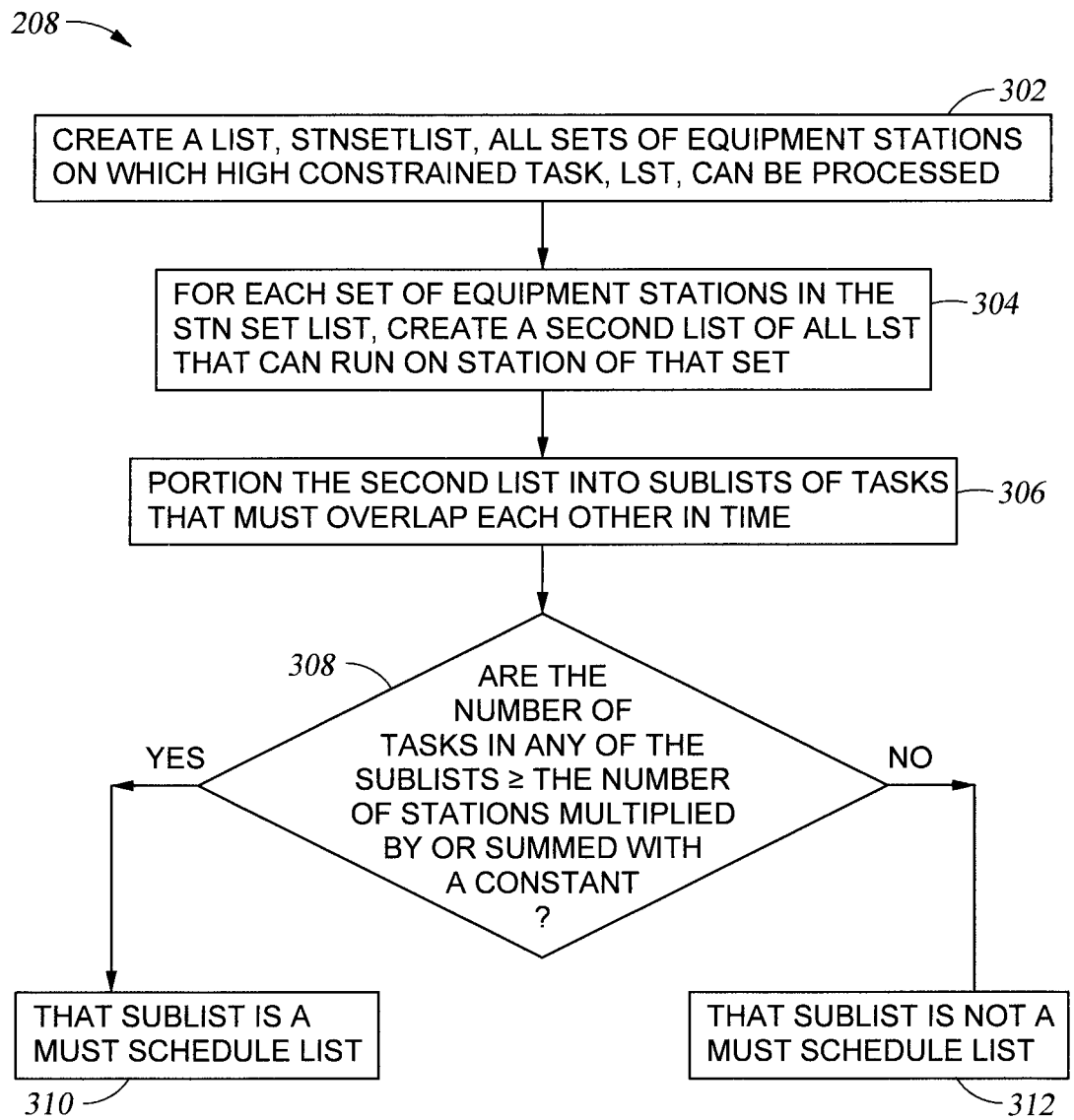
FIG. 3 illustrates a detailed flow diagram of a portion of the process sequence illustrated in FIG. 2.

FIG. 3 provides a more detailed explanation of operation 208. Operation 208 determines whether a portion of the list of highly constrained tasks exceeds the capacity of the plurality of semiconductor processing equipment stations. At operation 302, a list of sets of semiconductor processing equipment stations is created, referred herein after as StnSetList. A set $\{E_1, E_2, \ldots, E_n\}$ is in the StnSetList only if there is a highly constrained task that can run on that set of semiconductor processing equipment stations. For example, let $h_1$, $h_2$, and $h_3$ be highly constrained tasks. Assume $h_1$ can run on semiconductor processing equipment stations $E_1$ and $E_2$; $h_2$ can run on $E_2$; and $h_3$ can run on $E_1$, $E_2$, and $E_3$. Then, the StnSetList is $[\{E_1, E_2\}, \{E_2\}, \{E_1, E_2, E_3\}]$.

Operation 304 provides that, for each set in StnSetList formed at operation 302, a list of all the highly-constrained tasks that can run on semiconductor processing equipment stations in that set is generated. If a task can only run on $E_1$ and $E_2$, then the semiconductor processing equipment stations $E_1$ and $E_2$ is in the list associated with the set $\{E_1, E_2, \ldots, E_n\}$. Continuing with the above example, the set $\{E_1, E_2\}$ corresponds to a list $\{h_1, h_2, h_3\}$; the set $\{E_2\}$ corresponds to a list $\{h_1, h_2, h_3\}$; and the set $\{E_1, E_2, E_3\}$ corresponds to a list $\{h_1, h_2, h_3\}$.

After the list of all highly-constrained tasks that can run on sets in StnSetList is determined, operation 306 partitions this list into sub-lists of tasks that overlap each other in time. Tasks are said to overlap each other in time if, given two tasks, $T_1$ and $T_2$, the $LST_1$ is earlier than the $EET_2$ and $LST_2$ is earlier than the $EET_1$. Symbolically, this is expressed as $LST_1 > EET_2$ and $LST_2 > EET_1$.

Operation 308 determines whether any of the sub-lists generated at operation 306 is a Must Schedule Task List. A sub-list of tasks is added to the Must Schedule Task List if one of the following is satisfied: the number of tasks is equal to or exceeds the number of semiconductor processing equipment stations plus a constant; or, the number of tasks is equal to or exceeds the number of semiconductor processing equipment stations multiplied by a constant. This can be expressed as:

Number of Tasks≥Number of Stations+Constant; or

Number of Tasks≥Number of Stations*Constant.

The constant is greater than zero and may be configurable by the user. Operation 308 essentially determines whether the capacity of the plurality of semiconductor processing equipments stations is exceeded by one of the sub-lists of tasks created at operation 306. If the number of tasks in any of the sub-lists is equal to, or exceeds, the number of stations multiplied by, or summed with, a constant, then at step 310, the sublist is a must schedule list. If, however, the number of tasks in any of the sub-lists is less than the number of stations multiplied by, or summed with, a constant, then at step 312, the sublist is not a must schedule list.

Referring back to FIG. 2, provided that there are highly constrained tasks in the Must Schedule Task List created at operation 208, operation 210 provides that a task in the Must Schedule Task List is assigned at a next available time on one of the plurality of semiconductor processing equipment stations.

If, however, there are no highly constrained tasks in the Must Schedule Task List created at operation 208, operation 212 provides that a task from the plurality of tasks is assigned to run at a next available time on one of the plurality of semiconductor processing equipment stations.

Once a single task is assigned pursuant to either operation 210 or operation 212, the EST and LST for each task in the plurality of tasks yet to be scheduled is updated. The EST and LST for each of these tasks are updated at operation 214. For example, assume operations 206, 208, 210 and 212 scheduled the first task in the schedule. Each task, before any task in the plurality of tasks is scheduled, has an EST at t=0. Assume that task one, $T_1$, is the first task scheduled. Therefore, $EST_1=0$. According to operation 214, the EST and LST for all remaining tasks in the plurality of tasks are adjusted. Therefore, each remaining tasks from the plurality of tasks may or may not have an EST at time, t=0. The LST for each remaining tasks in the plurality of tasks is adjusted accordingly. If, however, there are pairs of tasks, $T_{1a}$ and $T_{1b}$, such that a queue time limit exists between $T_{1a}$ and $T_{1b}$, then the $LST_{1b}$ becomes $EET_{1a}$ plus the duration of $T_{1a}$ plus any queue time limit that exists between $T_{1a}$ and $T_{1b}$. Thus, as the schedule is created, if there is a queue time limit between $T_{1a}$ and $T_{1b}$ and $T_{1a}$ is scheduled, then it forces $LST_{1b}$ and $LET_{1b}$ to be small. In an example utilizing the processing system 100 from FIG. 1, a deposition operation can be represented as task $T_{1a}$, and a post deposition treatment operation can be represented as task $T_{1b}$. A queue time limit exists between a deposition operation and a post deposition treatment operation. The post deposition treatment operation may be utilized to alter or adjust the physical properties of the deposited layer, such as an anneal or other thermal process, a UV exposure, ion implant, plasma treatment, chemical treatment or other process which may alter or adjust the physical properties of the deposited layer. Thus, once the deposition task, $T_{1a}$, is scheduled, the LST and LET of the post deposition treatment process task is small.

After operation 214, operation 228 determines whether any tasks remain unscheduled in the plurality of tasks. If there are tasks in the plurality of tasks that are not scheduled, then the process repeats, beginning at operation 206; otherwise, the schedule created from operation 202 is complete. Once a schedule is created in accordance with operation 202, the plurality of substrates using the plurality of semiconductor processing equipment stations are processed in accordance with the schedule, as per operation 204. Alternatively, the substrate may be processed simultaneously with the generation of the process 200.

The process 200 illustrated in FIG. 2 may be applied to a semiconductor processing equipment station such as the processing system 100 of FIG. 1. FIGS. 4A-4D provide a diagram for how tasks on a processing system 100 may be scheduled in accordance with the process 200.

Figure 4A:
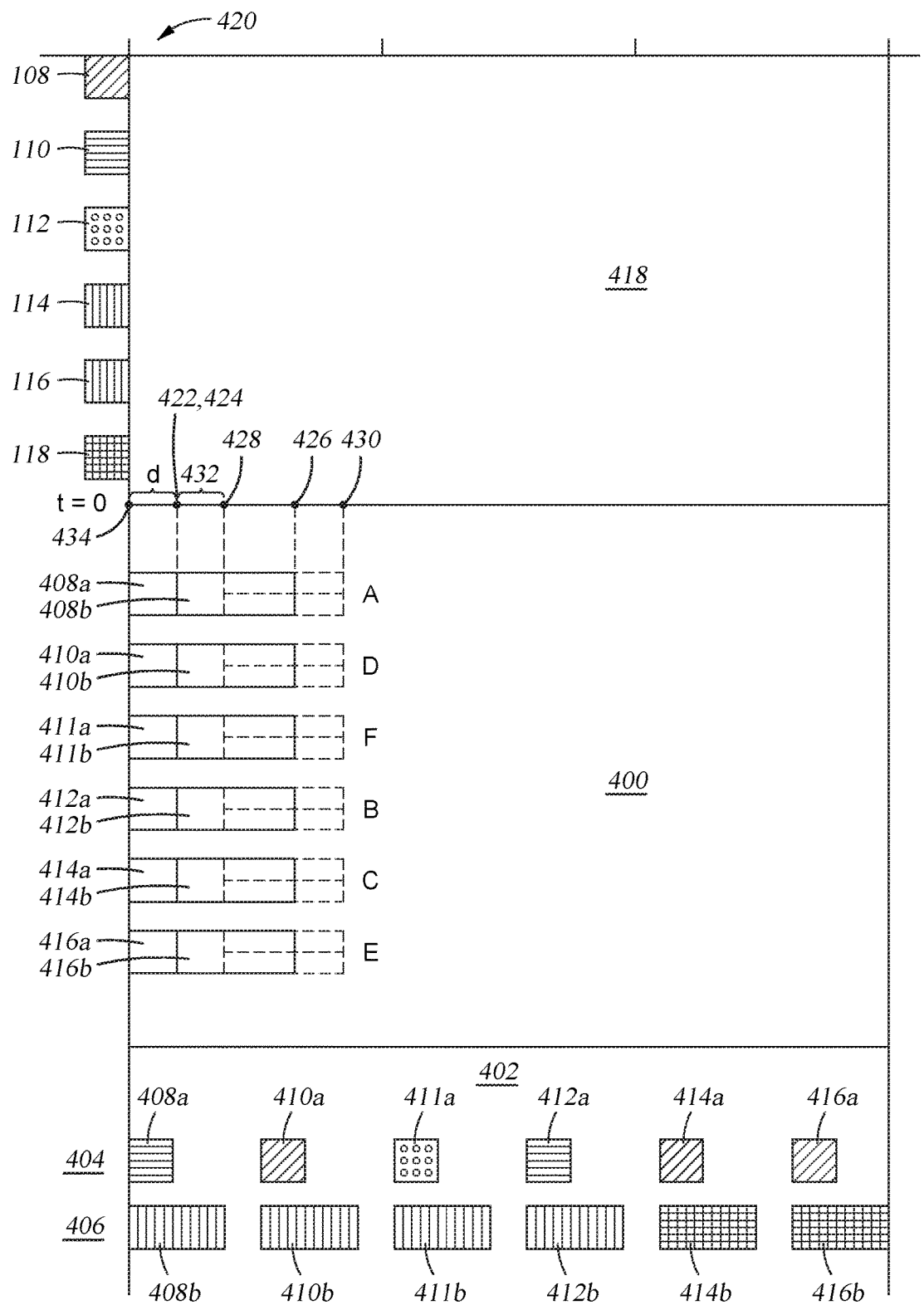
FIG. 4A illustrates a schedule before any task is assigned to the schedule.
Figure 4B:
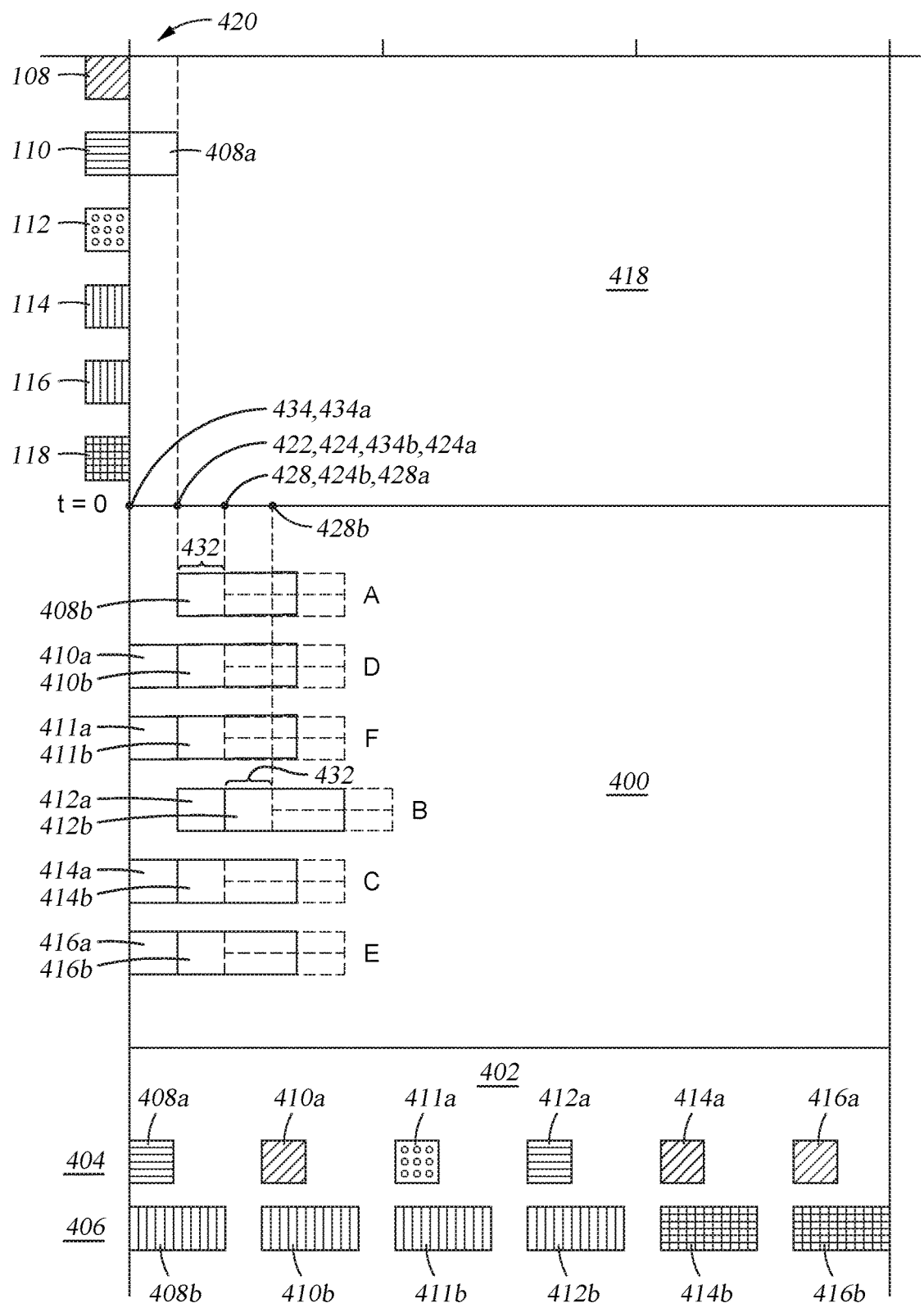
FIG. 4B illustrates the schedule of FIG. 4A, after a first iteration of the process sequence of FIG. 2, when a first task is assigned to the schedule.
Figure 4C:
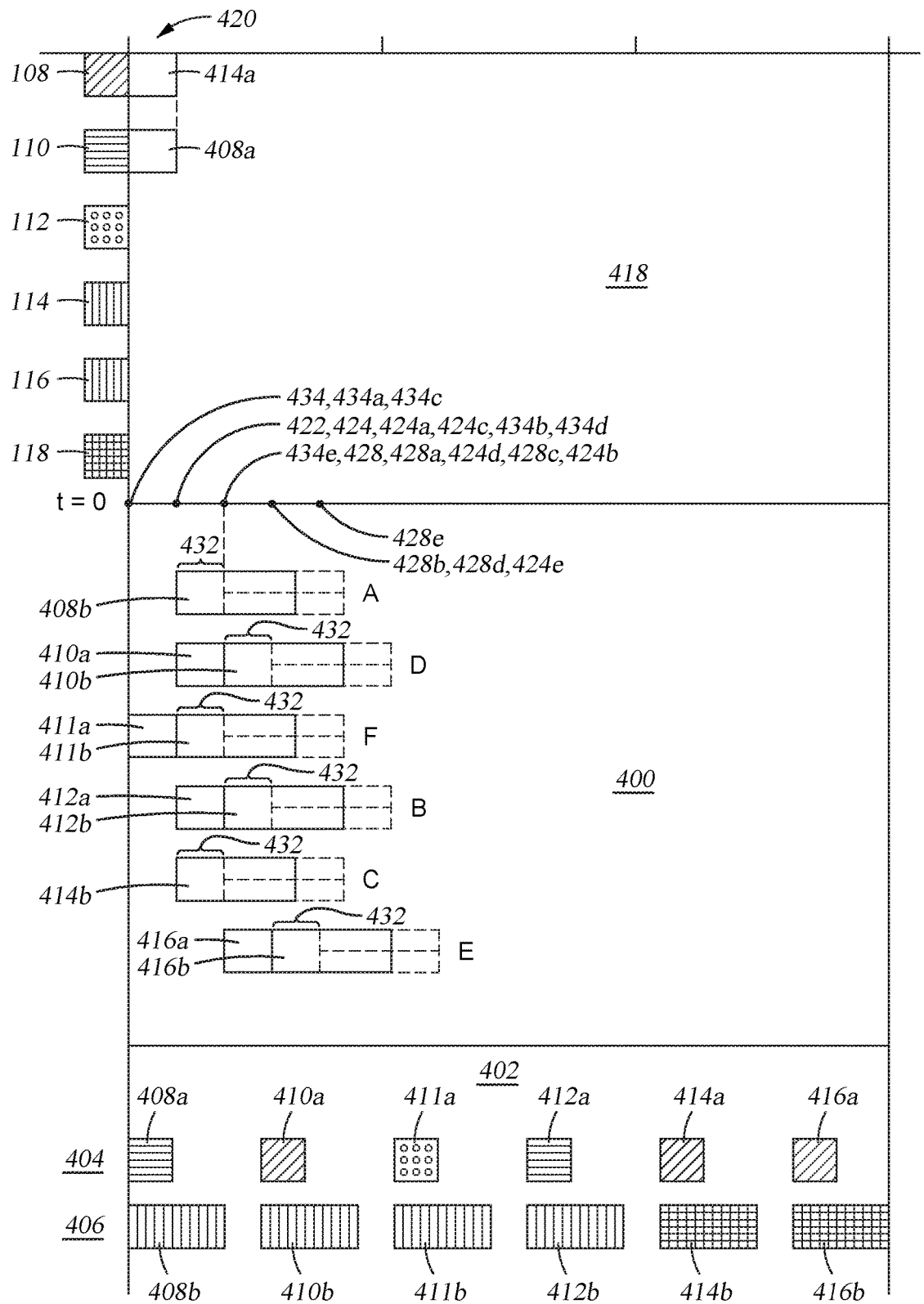
FIG. 4C illustrates the schedule of FIG. 4A, after a second iteration of the process sequence of FIG. 2, when a second task is assigned to the schedule.
Figure 4D:
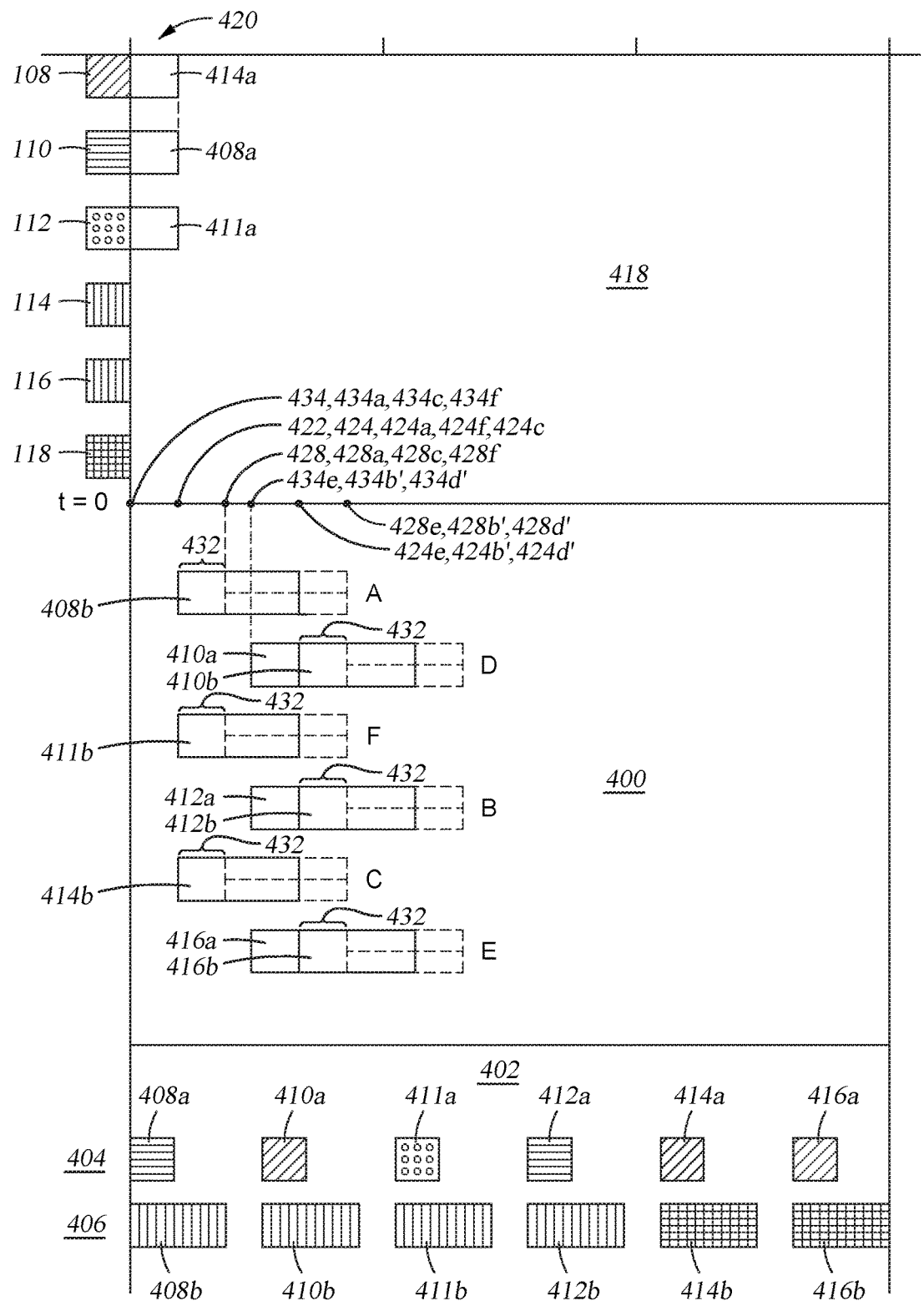
FIG. 4D illustrates the schedule of FIG. 4A, after a third iteration of the process sequence of FIG. 2, when a third task is assigned to the schedule.

FIG. 4A is a diagram of a schedule on the processing system 100 before any tasks is scheduled. FIG. 4B provides a diagram of the schedule in FIG. 4A after a first task is scheduled. FIG. 4C provides a diagram of the schedule in FIG. 4A after a second task is scheduled. FIG. 4D provides a diagram of the schedule in FIG. 4A after a third task is scheduled.

In FIGS. 4A-4D, the workpieces 402 are the items, such as substrates, glass panels, display substrates, LED substrates or other workpiece, on which task one and task two will perform. In one example, the processing system 100 may be utilized to perform two tasks: a first task 404 of depositing a dielectric layer on the substrate; and, a second task 406 of exposing the dielectric layer to a post deposition treatment process, such as an anneal or other thermal process, a UV exposure, ion implant, plasma treatment, chemical treatment or other process which may alter or adjust the physical properties of the deposited layer. The processing system 100 comprises process stations 108, 110, 112, 114, 116, 118. Assume processing stations 108, 110, 112 are used for deposition of a dielectric layer on the substrate; and stations 114, 116, 118 are used for the post deposition treatment process. Thus, each workpiece 402 must go through two tasks.

In FIGS. 4A-4D, the design in the interior of each respective stations of equipment 420 and the design in the interior of each workpiece 402 correspond to the equipment on which the workpiece 402 may be processed. For example, task 408a may be processed on station 110; and task 408b may be processed on station 114 and station 116. For purposes of this example, assume that there is also a queue time limit between all first tasks 404 and their respective second tasks 406. A schedule needs to be made for scheduling a plurality of these tasks on the processing system 100.

According to operation 206, a list of highly constrained tasks from the plurality of tasks is determined. Recall that a task is a highly constrained task if the difference between the LST and the EST is less than some constant. Assume that this constant is the constant k, wherein k is any number greater than zero and may be set by the user. Thus, for FIGS. 4A-4D, all first tasks 404 and all second tasks 406 are tasks such that the difference between the LST and EST for all first tasks 404 and all second tasks 406 is less than the constant k.

The schedule 418 is continually updated as tasks from the plurality of tasked are assigned to a station 108, 110, 112, 114, 116, 118, on the set of semiconductor processing equipment stations 420. Pursuant to operation 214 in FIG. 2, the EST and LST for each respective task is updated, as exhibited in the workspace 400.

Prior to scheduling a first task 404, each first task 404 has an initial $EST_i$ 434 at time t=0. Because each first task 404 has an initial $EST_i$ 434 at time t=0, each first task has an initial $EET_i$ 422 at a time, t=d, where d represents the duration of each first task 404. The LST (not shown) of each first task 404 may be any time such that the difference between the LST and the EST is less than a constant, k, for each first task 404. This ensures that each first task 404 is a highly constrained task, as per the definition of a highly constrained task. A queue time limit 432 exists between each first task 404 and each second task 406. Because the queue time limit 432 exists, each second task 406 is given an $EST_i$ 424 and $LST_i$ 428 with respect to the first task $EST_i$ 434. The second task $EST_i$ 424 occurs at the same time as the first task $EET_i$ 422, provided that there is no time lapse when the robot 105, 107 (FIG. 1) moves the substrate from station to station. The second task $LST_i$ occurs at a time equal to the $EST_i$ 424 plus the duration of the queue time limit between first task and the second task. The second task $EET_i$ 426 occurs at a time equal to the second task $EET_i$ 424 plus the duration of the second task. The second task $LET_i$ is equal to the second task $LST_i$ 428 plus the duration of the second task. Due to the queue time limit 432 that exists between each first task 404 and each second task 406, the second task $LST_i$ 428 with respect to the first task $EST_i$ 434, is fixed.

When a first task 404 is scheduled, the first task's 404 initial $EST_i$ 434, initial $EET_i$ 422 and the second task's 406 initial $EST_i$ 424, initial $EET_i$ 426, initial $LST_i$ 428, and initial task $LET_i$ 430 may change depending on: (1) what task was scheduled; and (2) upon what station in the set of semiconductor processing equipment stations 420 the task was scheduled. In FIG. 4B, the first iteration of operation 202 in FIG. 2 is complete. Task 408a is the first scheduled task. Task 408a is scheduled on station 110. Task 408a may only run on station 110. Thus, task 408a is scheduled for station 110. Task 408a has a start time ($ST_{408a}$) 434a at t=0. The $EST_i$ 434 for the remaining first tasks remain at t=0 because the sets of semiconductor processing equipment stations 420, on which each first task 404 and each second task 406 may run is available. Specifically, stations 108, 112, 114, 116, and 118 are available.

However, the $EST_i$ 434 for task 412a changes due to the unavailability of station 110. Task 412a can only run on station 110. The EST for task 412a moves from $EST_i$ 434 at t=0 to $EST_{412a}$ 434b. $EST_{412a}$ 434b is located at a point equal to the duration of task 408a. Because the EST of task 412a shifted from $EST_i$ 434 to $EST_{412a}$ 434b, the $EST_i$ 424 and $LST_i$ 428 for task 412b will change as well. For task 412b, $EST_i$ 424 shifts to $EST_{412b}$ 424b; $LST_i$ 428 shifts to $LST_{412b}$ 428b. Recall, the LST of task 412b is fixed at $LST_{412b}$ 428b because of the queue time limit 432 that exists between all first tasks 404 and all second tasks 406. The $EST_i$ 424 for task 408b is unchanged but is now labeled $EST_{408b}$ 424a; similarly, the $LST_i$ 428 for task 408b remains the same, but is now labeled $LST_{408b}$ 428a. Task 408b may run on either station 114 or station 116. Thus, task 408b will be scheduled on either station 114 or station 116 at any time from the $EST_{408b}$ 424b to the $LST_{408b}$ 428b.

FIG. 4C represents the schedule 418 after a second iteration of operation 202 is complete. In FIG. 4C, task 414a is scheduled. Task 414a may only run on station 108. Thus, task 414a is scheduled on station 108. The ST for task 414a is now fixed at $ST_{414a}$ 434c. This means that the EST for task 414b is fixed at $EST_{414b}$ 424c and the LST for task 414b is fixed at $LST_{414b}$ 428c. Task 414b may only be processed on station 118. Thus, task 414b will be scheduled on station 118 at any time between the $EST_{414b}$ 424c and the $LST_{414b}$ 428c. The $LST_{414b}$ 428c is fixed because a queue time limit 432 exists between task 414a and task 414b. The EST of task 411a remains at $EST_i$ 434. Similarly, the EST of task 411b remains at $EST_i$ 424, and the LST of task 411b, with respect to $EST_i$ 434, remains at $LST_i$ 428.

The data changes, however, for tasks 410a, 410b, 416a, and 416b. Task 414a and task 410a can only run on station 108. Thus, as soon as either task 414a or task 410a is scheduled on station 108, the unscheduled task is forced to wait in line and have a later start time. Here, the task 414a is scheduled. Therefore, the EST for task 410a must change. Thus, the EST for task 410a shifts from $EST_i$ 434 to $EST_{410a}$ 434d. Similarly, for task 410b, the EST shifts from $EST_i$ 424 to $EST_{410b}$ 424d; and the LST shifts from $LST_i$ 428 to $LST_{410b}$ 428*d*. The LST for task 410*b* is fixed at $LST_{410b}$ 428*d* because a queue time limit exists between task 410*a* and 410*b*.

The EST for task 416*a* changes as well, due to the scheduling of task 414*a*. Even though tasks 414*a* and 416*a* run on different stations, the fact that tasks 414*b* and 416*b* run on the same station, station 118, and that a queue time limit exists between task 416*a* and task 416*b*, the EST of task 416*a* must change. Thus, the effect that scheduling task 414*a* has on task 414*b* due to the queue time limit between task 414*a* and task 414*b* forces a change in the EST for task 416*b* and task 416*a*. The EST of task 416*a* changes from $EST_i$ 434 to $EST_{416a}$ 434*e*. The EST of task 416*b* changes from $EST_i$ 424 to $EST_{416b}$ 424*e*. Similarly, the LST of task 416*b* changes from $LST_i$ 428 to $LST_{416b}$ 428*e*.

In FIG. 4D, a third iteration of operation 202 has been completed. During this third iteration, task 411*a* is scheduled. Task 411*a* may only run on station 112. Thus, task 411*a* is scheduled on station 112. Task 411*a* has an ST at $ST_{411a}$ 434*f*. Because task 411*a* is scheduled, task 411*b* now has an EST at $EST_{411b}$ 424*f* and a LST at $LST_{411b}$ 428*f*. Task 411*b* may run on station 114 or station 116. Thus task 411*b* may be scheduled on either station 114 or station 116 at any time from the $EST_{411b}$ 424*f* to the $LST_{411b}$ 428*f*. Task 411*a* is the only task that runs on station 112; therefore, the scheduling of task 411*a* alone does not immediately yield a change in EST or LST of any other first task 404 or second task 406. However, because task 411*b* must be scheduled, as per the queue time limit 432 between all first tasks 404 and all second tasks 406, the scheduling of task 411*b* shifts the EST and LST of tasks 410*a*, 410*b*, 412*a*, and 412*b*. Task 411*b* runs on the same equipment, stations 114 and 116, as tasks 408*b*, 410*b*, and 412*b*. Task 411*b* is scheduled during the third iteration. Previously, task 408*b* was scheduled during the first iteration, as depicted in FIG. 4B. Therefore, stations 114 and 116 are occupied until at least a time equal to the $EET_i$ 426 of task 408*b* or the $EET_{411b}$ 426*f* of task 411*b*. Thus, the EST of task 410*a* is moved from $EST_{410a}$ 434*b* to $EST_{410a'}$ 434*b'*. This change forces the EST of task 410*b* to move from $EST_{410b}$ 424*b* to $EST_{410b'}$ 424*b'*, and LST of task 410*b* to move from $LST_{410b}$ 428*b* to $LST_{410b'}$ 428*b'*. Similarly, the change forces the EST of task 412*a* to move from $EST_{412a}$ 434*d* to $EST_{412a'}$ 434*d'*. It also forces the EST of task 412*b* to move from $EST_{412b}$ 424*d* to $EST_{412b'}$ 424*d'*, and the LST of task 412*b* to move from $LST_{412b}$ 428*d* to $LST_{412b'}$ 428*d'*.

Once task 411*a* is scheduled in FIG. 4D, the process continues until all tasks in the plurality of tasks are scheduled. Once the last task in the plurality of tasks is scheduled, the schedule has been created. In one example, after the schedule is created in accordance with operation 202 of the process 200, the substrates are processed at operation 204 in accordance with the schedule. In another example, substrates are processed at operation 204 in accordance with the portion of the schedule created over one or more iterations of the operation 202 so that substrates may begin processing while later portions of the schedule are being determined.

What is claimed is:

1. A method for sequencing a plurality of tasks performed by a processing system, the method comprising:
   generating a schedule by iteratively performing a scheduling process, the scheduling process comprising:
      generating a first list of highly constrained tasks from a plurality of tasks yet to be scheduled based on a difference between a latest start time and an earliest start time of each respective task;
      determining whether a portion of the first list of the highly constrained tasks exceeds a capacity of a plurality of semiconductor processing equipment stations comprising the processing system, wherein said determining comprises:
         generating a station set list of sets of semiconductor processing equipment stations corresponding to the semiconductor processing equipment station on which a highly constrained task can run;
         generating a second list based on each set of semiconductor processing equipment stations in the station set list by creating sets of highly constrained tasks that may run on each set of semiconductor processing equipment stations in the station set list; and
         determining for each set of highly constrained tasks in the second list whether the set of highly constrained tasks exceed the capacity of the plurality of semiconductor processing equipment stations;
      responsive to determining the portion of the first list does exceed the capacity, assigning a task from the first list of highly constrained tasks at a next available time on one of the plurality of semiconductor processing equipment stations;
      responsive to determining the portion of the first list does not exceed the capacity, assigning a task from the plurality of tasks yet to be scheduled to run at a next available time on one of the plurality of semiconductor processing equipment stations; and
      updating the latest start time and the earliest start time associated with each of the plurality of tasks yet to be scheduled based on the assigned task; and
   processing a plurality of substrates using the plurality of semiconductor processing equipment stations according to the schedule.

2. The method of claim 1, further comprising:
   determining if an overlap exists between each pair of tasks within each set of semiconductor processing equipment stations in the station set list, wherein an overlap exists if a latest first start time of a first task is earlier than a earliest second end time of a second task and a latest second start time for the second task is earlier than a earliest first end time; and
   partitioning the second list into sub-lists of highly constrained tasks that overlap each other in time.

3. The method of claim 1, wherein the first list of highly constrained tasks from the plurality of tasks yet to be scheduled is based on a difference between a latest start time and an earliest start time that is less than some constant, wherein the constant is greater than zero and may be set by a user.

4. The method of claim 3, wherein the constant is a duration of a task from the plurality of tasks yet to be scheduled.

5. The method of claim 1, wherein the portion of the first list exceeds the capacity of a plurality of semiconductor processing equipment stations when a number of tasks is greater than or equal to a number of stations multiplied by a constant, wherein the constant is greater than zero and may be set by a user.

6. The method of claim 1, wherein the portion of the first list exceeds the capacity of a plurality of semiconductor processing equipment stations when a number of tasks is greater than or equal to a number of stations plus a constant, wherein the constant is greater than zero and may be set by a user.

7. A method for a scheduling a plurality of substrate processing tasks performed by a processing system, the method comprising:
   generating a schedule for a plurality of substrate processing tasks by iteratively performing a scheduling process comprising:
      generating a first list of highly constrained tasks from a plurality of substrate processing tasks yet to be scheduled based on a difference between a latest start time and an earliest start time of each respective substrate processing task;
      determining whether a portion of the first list of the highly constrained tasks exceeds a capacity of the plurality of semiconductor processing equipment stations, wherein said determining comprises:
         generating a station set list of sets of semiconductor processing equipment stations corresponding to the semiconductor processing equipment station on which a highly constrained task can run;
         generating a second list based on each set of semiconductor processing equipment stations in the station set list by creating sets of highly constrained tasks that may run on each set of semiconductor processing equipment stations in the station set list; and
         determining for each set of highly constrained tasks in the second list whether the set of highly constrained tasks exceed the capacity of the plurality of semiconductor processing equipment stations;
      responsive to determining the portion of the first list does exceed the capacity, assigning a substrate processing task from the first list of highly constrained tasks at a next time on one of the plurality of semiconductor processing equipment stations;
      responsive to determining the portion of the first list does not exceed the capacity, assigning a task from the plurality of substrate processing tasks yet to be scheduled to run at a next time on one of the plurality of semiconductor processing equipment stations; and
      updating the latest start time and the earliest start time associated with each of the plurality of substrate processing tasks yet to be scheduled based on the assigned substrate processing task; and
   processing a plurality of substrates using the plurality of semiconductor processing equipment stations according to the schedule.

8. The method of claim 7, further comprising:
   determining if an overlap exists between each pair of tasks within each set of semiconductor processing equipment stations in the station set list, wherein an overlap exists if a latest first start time of a first task is earlier than a earliest second end time of a second task and a latest second start time for the second task is earlier than a earliest first end time; and
   partitioning the second list into sub-lists of highly constrained tasks that overlap each other in time.

9. The method of claim 7, wherein the first list of highly constrained tasks from the plurality of tasks yet to be scheduled is based on a difference between a latest start time and an earliest start time that is less than some constant, wherein the constant is greater than zero and may be set by a user.

10. The method of claim 9, wherein the constant is a duration of a task from the plurality of tasks yet to be scheduled.

11. The method of claim 7, wherein the portion of the first list exceeds the capacity of semiconductor processing equipment stations when a number of tasks is greater than or equal to a number of stations multiplied by a constant, wherein the constant is greater than zero and may be set by a user.

12. The method of claim 7, wherein the portion of the first list exceeds the capacity of semiconductor processing equipment stations when a number of tasks is greater than or equal to a number of stations plus a constant, wherein the constant is greater than zero and may be set by a user.

* * * * *